Figure 1:
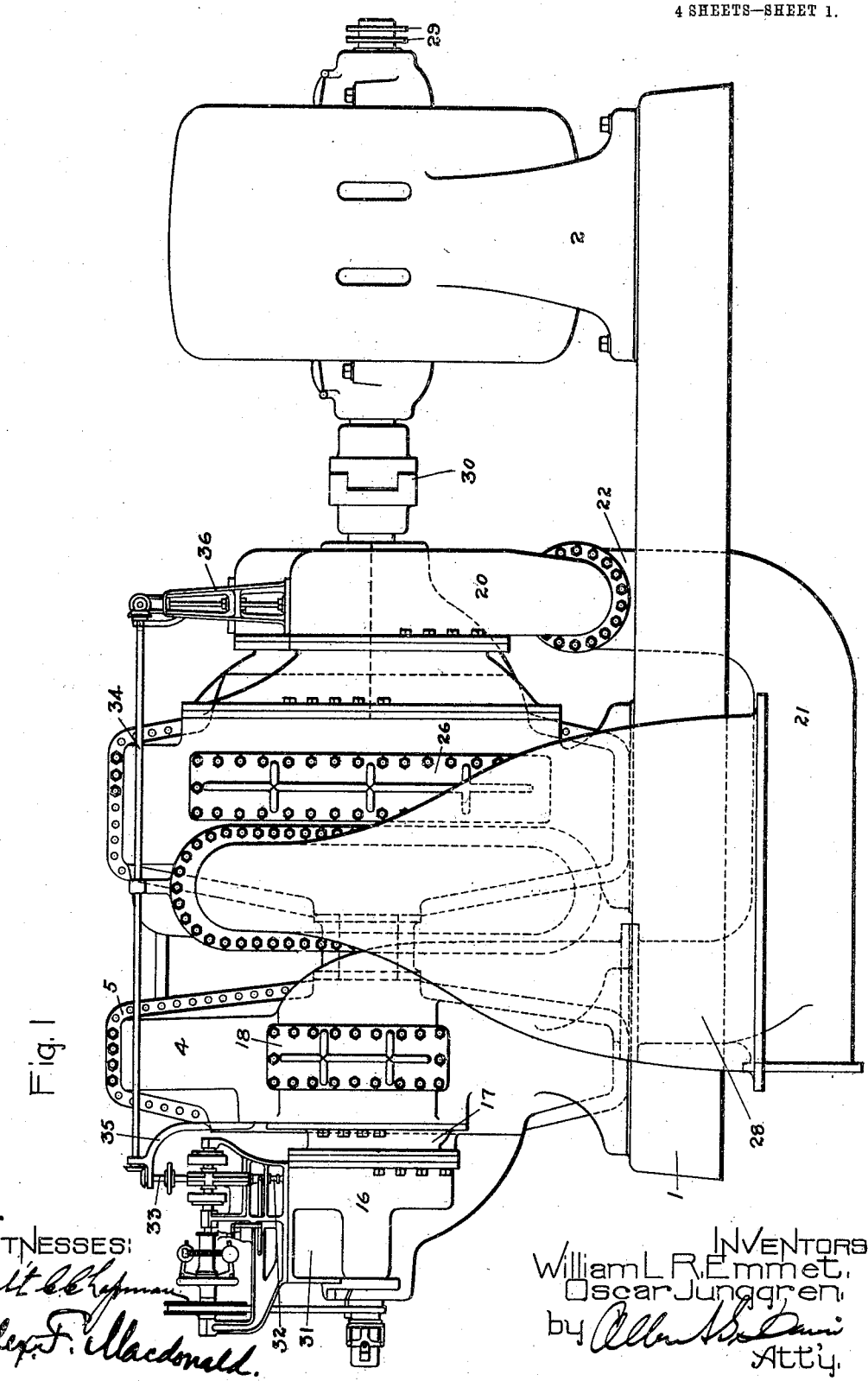

No. 792,653. PATENTED JUNE 20, 1905.
W. L. R. EMMET & O. JUNGGREN.
ELASTIC FLUID TURBINE.
APPLICATION FILED FEB. 14, 1903.

4 SHEETS—SHEET 1.

WITNESSES:
Robt. S. Lyman
Alex. F. Macdonald.

INVENTORS:
William L. R. Emmet,
Oscar Junggren,
by Albert G. Davis
Atty.

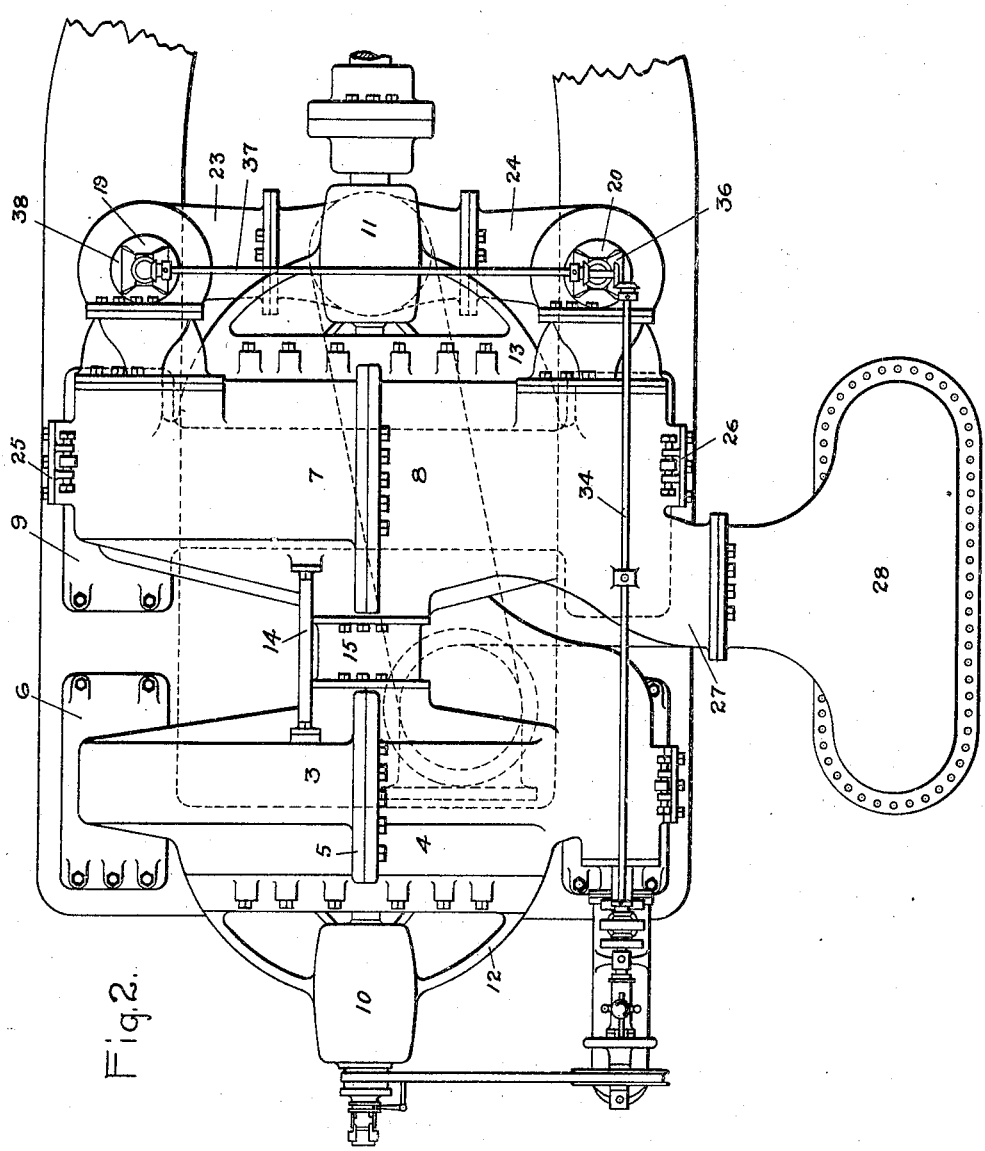

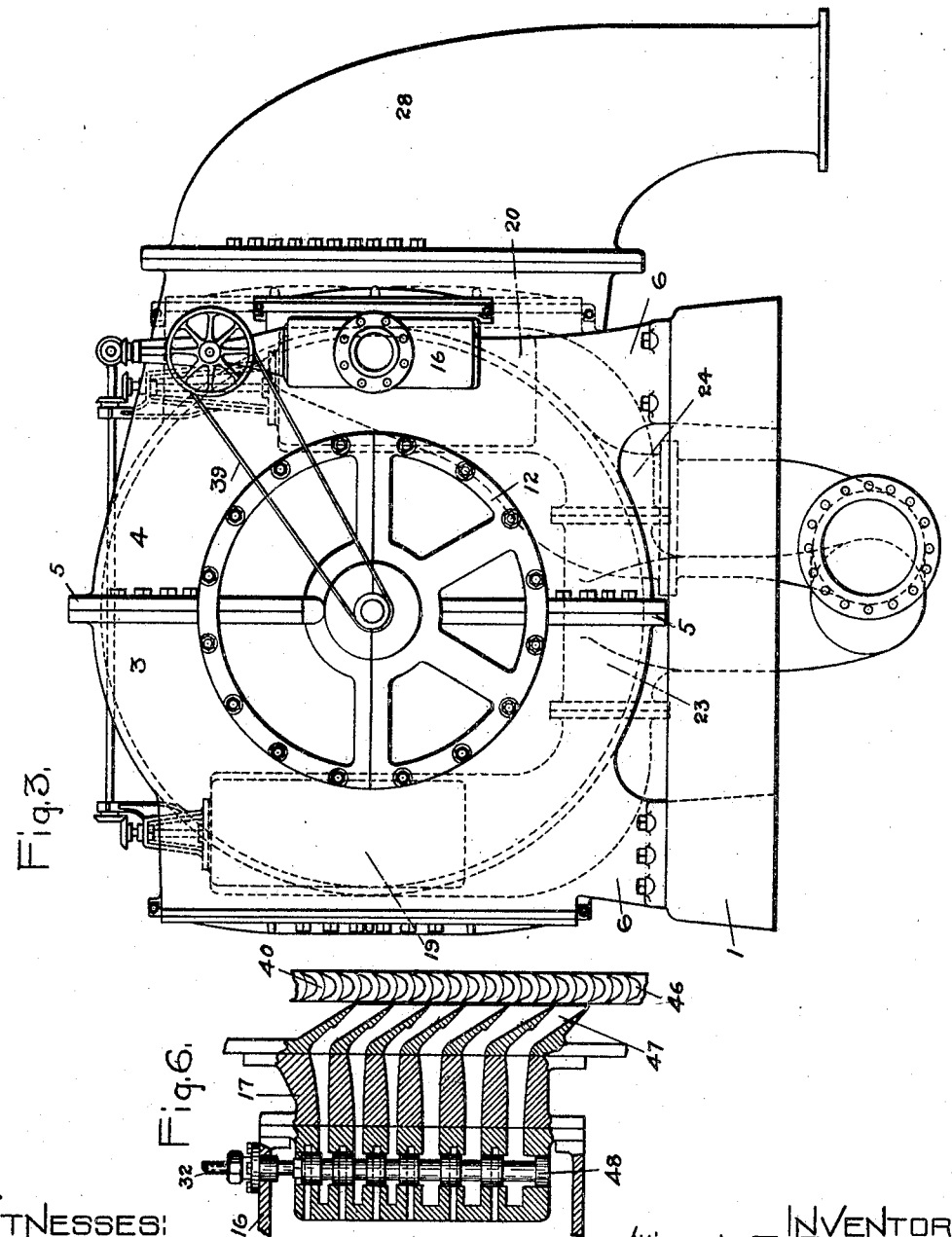

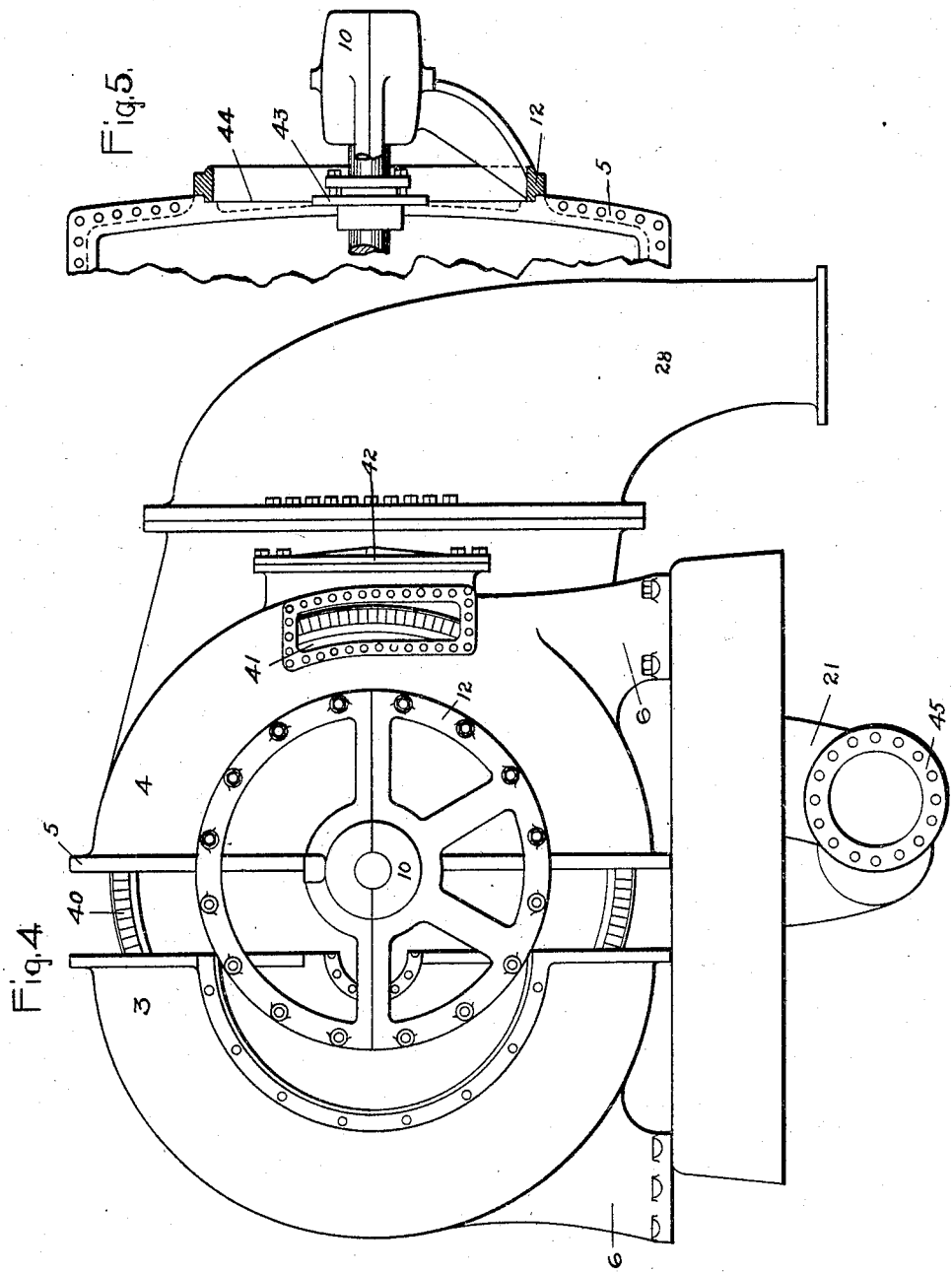

No. 792,653.

Patented June 20, 1905.

UNITED STATES PATENT OFFICE.

WILLIAM L. R. EMMET AND OSCAR JUNGGREN, OF SCHENECTADY, NEW YORK, ASSIGNORS TO GENERAL ELECTRIC COMPANY, A CORPORATION OF NEW YORK.

ELASTIC-FLUID TURBINE.

SPECIFICATION forming part of Letters Patent No. 792,653, dated June 20, 1905.

Application filed February 14, 1903. Serial No. 143,283.

*To all whom it may concern:*

Be it known that we, WILLIAM L. R. EMMET and OSCAR JUNGGREN, citizens of the United States, residing at Schenectady, county of Schenectady, State of New York, have invented certain new and useful Improvements in the Construction of Elastic-Fluid Turbines, of which the following is a specification.

In order to facilitate the handling of elastic-fluid turbines—such, for example, as assembling, repairing, shipping, &c.—it is desirable to divide the machine into sections. It is also desirable to arrange the various parts of which the machine is composed in such manner that one or more of them can be removed without disturbing the relation of the other part or parts. Owing to the restricted floor-room that usually exists in engine-rooms, it is also important to condense the machine into the smallest possible space.

The present invention has for its object to provide an elastic-fluid turbine which is simple and compact, occupies a relatively small small floor-space, and is so constructed that its various parts are readily accessible.

For a consideration of what we consider to be novel and our invention attention is called to the accompanying description and the claims appended thereto.

In the accompanying drawings, which represent an embodiment of our invention, Figure 1 is a side elevation of a turbine and generator mounted on the same base. Fig. 2 is a plan view of the turbine. Fig. 3 is an end view thereof. Fig. 4 is an end view with the principal parts of the casing separated and some of the parts removed. Fig. 5 is a detail showing the support for a main-shaft bearing, and Fig. 6 shows the relation of the nozzle and the bucket-wheel.

1 represents the base of the machine, which is faced to receive the casings or shells for the wheels and also the base 2 of a dynamo-electric machine. The casing for the first wheel or high-pressure stage is made in two parts 3 and 4, the line of division being at right angles to the plane of the base 1. Each part of the casing is provided with a flange 5, by means of which they can be secured together and a steam-tight joint insured. Each part of the casing is provided with a foot or support 6, which rests on a spot-faced portion of the base 1. It is secured to the base by means of bolts. The under side of this foot is the lowest point of the shell or casing. This is to permit the halves of the first shell or casing to be separated by moving them sidewise away from the wheel, Fig. 4. The under side of the flange 5 occupies substantially the same level as the under side of the foot, and by engaging with the frame 1 it serves to prevent the casing from tipping when moved to the position shown. The second-stage wheel-casing is similarly constructed—that is to say, it is made up of parts 7 and 8, with the line of division in a plane at right angles to the base. Each part of the casing is provided with an enlarged foot or support 9, that engages with a spot-faced portion of the base 1. The under surface of these feet is as low or even slightly lower than any other portion of the casing, so that the sides may be separated by a sidewise movement away from the wheel, or one section can be removed, leaving the other in place. This is also true of the casing for the first wheel.

The wheel-shaft is supported in suitable bearings 10 and 11. These bearings are split in a plane parallel to the base and are mounted on heads 12 and 13, that are bolted to the shell. The bearing 10 and its head are bolted to the outer end of the first-stage casing or shell, while the bearing 11 and its head 13 are bolted to the outer end of the second-stage casing or shell. Situated between the two shells and near the upper part is a stay or brace 14 for uniting the shells. Surrounding the shaft and connecting the shells is a small sleeve 15. The sleeve is provided with outwardly-turned flanges, which are bolted to the adjacent hubs of the wheel-casings. Steam is admitted to the first wheel by a valve located in the valve-chest 16, the latter being connected to the shell by a conduit 17, having outwardly-extending flanges that are bolted to the valve-chest and the wheel-casing. In order to properly direct the passage of motive fluid through the wheel-buckets, intermediate buckets are employed, which are mounted on the detachable supports 18. It is evident from inspection that by removing the bolts the support 18 can be detached for the purpose of inspection or repairs.

Steam or other motive fluid is admitted to the second-stage nozzles by means of two valves contained in the steam-chests 19 and 20, Fig. 2. The motive fluid for the second stage is received from the first stage and is conveyed to the controlling-valves by the conduit 21, that is attached to a flange on the under side of the first-stage shell. From the flange the conduit drops downward and then extends horizontally underneath the second-stage shell and then upward, as at 22, where it is forked and the portion 23 connected to the valve-chest 19 and the portion 24 connected to the valve-chest 20. The second-stage casing is provided with two sets of intermediates 25 and 26, one being carried by one half of the shell and the other by the other half. The exhaust from the second-stage wheel is delivered by the enlarged throat 27, formed on the casing 8, into the exhaust-hood 28, that may or may not be connected to a condenser, as desired.

The generator connected to the main shaft may be of any suitable character. In the present instance it represents an alternating-current machine having two or more collecting-rings 29. The center of rotation corresponds with the center of rotation of the turbine-wheels, and a single shaft may be employed, if desired; but we find it desirable to make the turbine and the generator-shafts separate and connect them by a coupling 30, which may be constructed as desired.

The governor may be of any suitable construction for regulating the valves of the high and low pressure stages. In the present instance the valve-chest 16 is provided with a portion 31, that acts as a support. This governor will not be specifically referred to herein, because it forms the subject-matter of a separate application. It is sufficient to say that it imparts movement to the stem 32 in a manner to vary the supply of steam to the first-stage wheel in response to speed variations. The governor also acts on the shaft 33 in a manner to cause the valves of the second stage to vary the admission of steam or other motive fluid in accordance with the speed variations. The variations in the first and second stages are made simultaneously. The horizontal shaft 34, which extends parallel with the main shaft and transmits motion from the shaft 33 to the left-hand second-stage valve, is supported by suitable brackets 35 and 36, the former being secured to the first-stage shell and the latter to some part of the second-stage shell—such, for example, as the valve-chest 20. Motion is transmitted from the shaft 34 to the shaft 37 by bevel-gears, and the said shaft is carried by supports 36 and 38, both of which are supported by the second-stage valve-chests.

From the foregoing it is evident that by removing the bolts and taking off the minor parts the two parts of the first or second stage casing can be separated in a manner to expose the wheel or wheels to view. In connection with this matter it should be noted that the bearings 10 and 11 are each bolted to a separate shell and are supported by both parts of the casing. By taking the bolts out of one-half of the bearing-supporting head one-half of the casing can be removed without disturbing the alinement of the main shaft. This is a most important consideration, because the clearances between the moving and stationary parts are very small, and the slightest inaccuracy in alinement causes the parts to rub. We may remove either the right or left hand sections of one or both stages without disturbing the alinement, and since the heads 12 and 13 for the bearings are split on a horizontal plane, as is indicated in Figs. 4 and 5, the top of the bearings can be removed for inspection without in any way disturbing the wheel alinement.

The detachability of the parts of the casing is well shown in Figs. 3 and 4, wherein 6 represents the feet of the casing-sections located on opposite sides of the main shaft, and it will be noted that the flanges 5, formed on the meeting faces, extend down to the upper surface of the base 1. The position of the valve-chest 16 is such that the bolts can be removed from the bearing-head 12 without difficulty. The positions of the second-stage valve-chests 19 and 20 are indicated by dotted lines. The governor is actuated by a belt 39, that is driven by a pulley on the main shaft. The forked or U-shaped arrangement of the second-stage conduit 23 24 is also clearly shown.

Referring to Fig. 4, we have shown the parts of the shell 3 and 4 separated, so as to expose the bucket-wheel 40. The right-hand side of the casing 4 is provided with an opening 41, having a finished surface surrounding it, on which is seated the valve-chest 16. The chest being removed in the present illustration, the wheel is exposed to view. Situated in line with this opening and carried by the support 42 are intermediate buckets situated between the rows of wheel-buckets. The head for the bearing 10 is split on a horizontal plane, so that the upper half of the head can be removed when for any reason it becomes necessary to inspect the shaft. In removing one side of the shell or casing the bolts on that side of the head are removed, as well as the bolts which hold the flanges 5 together. The bolts which secure the main-shaft packing 43, Fig. 5, are also removed. The two parts of the head 12 are seated on a finished surface 44, and since this surface represents the greatest width and is perfectly flat it permits the separation of the casing without taking down or in any way disturbing the main-shaft bearing.

The conduit 21, leading from the first to the second stage, is provided with an open end 45, which when the turbine is running with a condenser would be normally closed, but when the turbine is running non-condensing may communicate with the atmosphere through a suitable pipe.

Owing to the large number of bolts employed to maintain steam-tight joints between the parts, many of them have been omitted for the sake of clearness of illustration; but it is to be understood that the necessary number of bolts is employed to maintain steam-tight joints between adjoining parts.

It is to be noted that the motive fluid is delivered to the left-hand side of the first-stage bucket-wheel and to the right-hand side of the second-stage bucket-wheel. This arrangement serves to equalize the thrusts exerted on the bucket-wheels and the necessity of using thrust-collars is done away with.

We prefer to construct the intermediate and rotary buckets so that little or no longitudinal thrust is exerted on the main shaft; but in case the buckets are not so designed the arrangement specified will reduce or entirely eliminate end thrust on the shaft.

In Fig. 6 is shown a wheel 40, having peripheral buckets 46, between which the working passages are formed. Steam or other elastic fluid is delivered to the wheel-buckets by the passages 47, which can with advantage form a part of a sectionalized nozzle of the expanding type. In order to control the admission of fluid to the nozzle-sections, a balanced piston-valve 48 is employed, which is mounted in a suitable casing or valve-chest 16. The valve is actuated by a governor mechanism that is responsive to speed variations through the stem 32. The nozzle-sections are arranged to change the pressure of the steam into velocity which is more or less great, and the rows of buckets on the wheels are arranged to fractionally abstract the velocity of the motive fluid as it flows through the working passage.

In accordance with the provisions of the patent statutes we have described the principle of operation of our invention, together with the apparatus which we now consider to represent the best embodiment thereof; but we desire to have it understood that the apparatus shown is only illustrative and that the invention can be carried out by other means.

What we claim as new, and desire to secure by Letters Patent of the United States, is—

1. In a turbine, the combination of a bucket-wheel, a shaft therefor, a shell for the wheel that is divided into sections in a diametral plane, a support or foot for each section, bearings for the shafts which are detachably secured to said sections, a base that is common to the sections, on which the supports or feet rest, and a nozzle for delivering fluid to the bucket-wheel.

2. In a turbine, the combination of a bucket-wheel, a shell therefor which is divided into two parts in a diametral plane at right angles to the base, which sections are removable without disturbing the wheel, means for securing the parts together, intermediates supported by a section, a nozzle for delivering fluid to the wheel, and a base to which the sections are secured.

3. In a turbine, the combination of a bucket-wheel, a means for delivering fluid to the wheel, a shell therefor which is divided into parts in a plane at right angles to the base whereby one section or the other can be removed without disturbing the wheel, intermediate buckets carried by and removable with a section, which receive fluid from one row of wheel-buckets and discharge it against the next, a supporting-foot for each section, which forms the lowest part thereof, and a base to which the feet are secured.

4. In a staged turbine, the combination of bucket-wheels, expanding nozzles therefor, nozzle-controlling means, a separate shell which incloses each wheel and is divided into sections on a diametral plane, bearings for the shaft of the wheels, and heads for supporting the bearings, one head being carried by one shell, the other by a different shell.

5. In a turbine, the combination of a bucket-wheel and shaft, a casing therefor which is divided into sections in a plane at right angles to the base so that the wheel can be exposed by moving a section laterally, a base to which the sections are secured, a bearing for the wheel-shaft, and a head for supporting the bearing, that is supported by both of the casing-sections so that one section can be moved without disturbing the bearing and the alinement of the shaft.

6. In a staged elastic-fluid turbine, the combination of bucket-wheels, a separate shell for each wheel, an exhaust-conduit which is connected to one shell at a point between it and the adjacent shell, and to the outer end of a second shell so that the motive fluid passes from one shell to the other, and an exhaust-hood that is connected to the second shell at a point substantially between the shells.

7. In a staged turbine, the combination of bucket-wheels, a separate shell which incloses each wheel, a nozzle for each stage, intermediate buckets for each stage, an exhaust-conduit that is connected to the first shell at a point between the shells and extends under the second shell, and is connected to the outer end of said second shell, and an exhaust-hood that is detachably secured to one side of the second shell.

8. In a staged turbine, the combination of bucket-wheels, a separate shell for each wheel, a steam-chest that is affixed to one end of the first shell, an exhaust-conduit that is affixed to the first shell and extends under the second shell, a steam-chest that is connected to the second shell and also to the exhaust-conduit, and an exhaust-hood that is bolted to the second shell.

9. In a staged turbine, the combination of bucket-wheels, a separate shell for each wheel, a steam-chest for the first shell, an exhaust-conduit connected to the first shell, which is provided with discharge-openings, steam-chests for the second stage, that correspond in number to the openings in the exhaust-conduit, nozzles for the second stage corresponding in number to the steam-chests, and a means for exhausting the second shell.

10. In a staged turbine, the combination of bucket-wheels, a sectional shell for the first wheel, a steam-chest, a detachable conduit connecting the chest with a shell-section and acting as a support therefor, a sectional shell for the second wheel, a second steam-chest, a detachable conduit connecting the second chest with a section of the second shell and acting as a support therefor, an exhaust-conduit which receives steam from the first shell and delivers it to the valve-chest of the second shell, and a base on which the shells are mounted.

11. In a steam-turbine, the combination of relatively movable buckets which are suitably inclosed, a steam-chest, an admission-port for the chest, expansion-nozzles communicating with the chest and directed toward the buckets, an exhaust-port, a second steam-chest, a passage connecting said exhaust-port with the last-named steam-chest, a second set of nozzles discharging steam in a direction opposite to that of the said expanding nozzles and communicating with the second steam-chest and directed toward the buckets, and a final exhaust-port.

In witness whereof we have hereunto set our hands this 12th day of February, 1903.

WILLIAM L. R. EMMET.
OSCAR JUNGGREN.

Witnesses:
BENJAMIN B. HULL,
HELEN ORFORD.